United States Patent [19]

DiGregorio et al.

[11] Patent Number: 4,869,818
[45] Date of Patent: Sep. 26, 1989

[54] ORBITAL WASTEWATER TREATMENT SYSTEM WITH COMBINED SURFACE AERATOR AND SUBMERGED IMPELLER

[75] Inventors: David DiGregorio; Mark G. Biesinger, both of Salt Lake City; Frederick M. Riser, Sandy, all of Utah

[73] Assignee: Baker International Corporation, Houston, Tex.

[21] Appl. No.: 47,802

[22] Filed: May 8, 1987

[51] Int. Cl.$^4$ .............................. C02F 3/16; C02F 3/20
[52] U.S. Cl. ..................................... 210/194; 210/219; 210/220; 210/926
[58] Field of Search ............... 210/629, 194, 219, 926, 210/220; 261/87, 91, 93, 36 R

[56] References Cited

U.S. PATENT DOCUMENTS

| | | | |
|---|---|---|---|
| 3,510,110 | 5/1970 | Klein | 210/926 |
| 3,954,606 | 5/1976 | Block et al. | 261/91 |
| 4,267,052 | 5/1981 | Chang | 261/91 |
| 4,290,885 | 9/1981 | Kwak | 261/87 |
| 4,297,214 | 10/1981 | Guarnaschelli | 261/87 |

FOREIGN PATENT DOCUMENTS

| | | | |
|---|---|---|---|
| 2023981 | 11/1971 | Fed. Rep. of Germany | 261/87 |
| 2706078 | 8/1978 | Fed. Rep. of Germany | 210/926 |
| 718372 | 3/1980 | U.S.S.R. | 261/87 |

Primary Examiner—Benoit Castel
Attorney, Agent, or Firm—Skjerven, Morrill, MacPherson, Franklin & Friel

[57] ABSTRACT

An improved wastewater aeration and mixed liquor pumping arrangement for an orbital-type actuated sludge purification method includes the addition of a radial flow impeller on a shaft extension below the normal surface aerator. Both the combined radial flow impeller and surface aerator are positioned with respect to an end of a partition wall forming the flow channels of the orbital system such that both the impeller and the aerator pump the mixed liquor in the same direction, so that the mixed liquor is moved at a sufficient velocity through and around the various channels and returned. The radial flow impeller is positioned adjacent to the bottom of the orbital channel and enhances the propulsion of the mixed liquor along the bottom of the channel thus permitting deeper channels with attendant concrete and land area savings in constructing the system. The system may be operated at various wastewater levels so that when oxygenation levels are high or oxygenation needs are low, the level is lowered by a weir so that only the lower radial impeller functions to propel the mixed liquor. Auxiliary compressed or aspirated air may also be inputted through the lower radial impeller.

8 Claims, 1 Drawing Sheet

ORBITAL WASTEWATER TREATMENT SYSTEM WITH COMBINED SURFACE AERATOR AND SUBMERGED IMPELLER

FIELD OF THE INVENTION

This invention relates to an orbital-type waste water treatment system utilizing activated sludge. More particularly, it relates to an improved means for propelling the mixed liquor within the orbital essentially closed circuit tank and around an elongated interior partition wall forming at least two parallel connected channels where a vertical mixed liquor pump is spacedly positioned at an end of the partition wall for both aerating the mixed liquor and moving the mixed liquor around the channels.

BACKGROUND OF THE INVENTION

An early circa 1960 installation by Pasveer for waste water, i.e. primarily sewage, purification by the activated biological sludge method included a closed circuit or ditch with a horizontally-rotated brush rotor used for adding needed oxygen (air) to the sewage and moving the sewage in circulation. In U.S. Pat. No. 3,510,110, an orbital system employing an elongated tank with central partition was disclosed which employed a vertically-rotated surface aerator located at the end(s) of the partition wall for both aerating the sewage and circulating the sewage around the channels formed by the patition wall and the sides of the tank. This latter system has had great commercial success with over 500 plants in operation world-wide (ranging from less than 1 MGD capacity to one of over 10 million population equivalent) with over 100 plants in operation or in various construction phases since 1976 in the United States up to the present time. Sold under the trademark "Carrousel®", the high popularity of the system is due primarily to its cost-effectiveness, simplicity of design, ease of operation and maintenance, and excellent effluent quality. It can treat raw domestic water to EPA advanced secondary standards without primary clarifiers or effluent filters. With extended aeration, it produces a highly stable water sludge requiring little or no further processing prior to disposal. Carrousel systems can be designed to have a power turn-down of 50–75%. Aerator drive horsepower can be varied from 100% of installed capacity to as little as 25% without loss of mixing and continuing sufficient mixed liquor channel velocity. This power down flexibility provides an ability to closely match oxygen input to the mixed liquor to oxygen demand of the microbes acting to degrade the sewage, without loss of mixing and movement. In the largest U.S. installation, over 25 MGD of sewage is treated in four units having twenty aerators utilized to aerate and circulate sewage through twenty-four channels formed by twenty partitions and exterior encircling concrete walls forming four tanks.

In U.S. Pat. No. 3,900,394, an orbital system, including a surface aerator and partition wall, also utilizes a separate mixing and propulsion means or uses units alternately as propulsion-mixers and as aerators, as desired.

One of the limitations of the present systems has been the depth of the channels which must be somewhat shallow to allow the surface aerator(s) to impel the mixed liquor along the whole effective cross-sectional depth of the channel without a build-up of settled solids on the bottom. Such settling would lessen the available volume in the circuit for treatment purposes by taking up a proportion of the original volume, effectively wasting the additional costly concrete and land area utilized in making the originally sized channels. Further, as with all systems, sellers, operators and users are concerned with maximizing the efficiency of their equipment and minimizing operating costs at all times during the system operation.

Mechanical surface aerators have been utilized for some years for oxygen (air) transfer into large lagoons or nonorbital tanks either suspended from fixed bridges in a tank or on floating platforms anchored by piles or cables. By changing the ballast in float pontoons, the aerator submergence can be altered and the horsepower draw changed as the aerator rises and falls as the liquid level changes. Rotational speed or submergence of the aerators by a weir level adjustment also can be varied to change the impeller horsepower draw. The typical impeller for these applications includes an inverted cone impeller plate having a series of radial impeller blades extending downwardly from the underside of the conical impeller plate. These aerators are used for aerating and mixing of waste water in the tank or lagoon. Normally a grid of aerators are positioned over the lagoon surface area. If lagoons, basins or tanks are too deep to provide proper mixing, it has been contemplated to provide a four or six-bladed submerged mixing turbine attached to the bottom of the surface impeller at a position at the mid-depth of the basin. Draft tubes and baffles, to prevent excessive vortexing and provide smooth hydraulic flow to the aerator impeller, have also been employed in mechanical surface aerators in nonorbital systems.

SUMMARY OF THE INVENTION

The present invention basically involves the addition of a radial flow high efficiency submerged impeller to the same vertical shaft which rotates the surface aerator and in locating that submerged impeller at an end of the partition wall(s) forming the channels in an orbital system. By such provision and location, the lower radial flow impeller pumps mixed liquor in the same direction and manner as the surface aerator but with a portion of the pumping energy located at the tank bottom rather than all at the surface. This effectively alleviates the present depth restriction of orbital systems and allows orbital systems of greater depth. For the same system volume, deeper channels require less concrete and land space than shallow channels and are less costly.

Additionally, the lower impeller will improve pumping capacity since often an excess of power over that required for oxygenation must be installed to satisfy pumping means to circulate the mixed liquor around the channels. Improving the pumping efficiency by utilizing a higher efficiency radial flow impeller will result in a reduction in installed power and less or smaller aerators and channels in orbital installations.

Additionally, the present invention increases the power turndown capacity of orbital surface aerator systems. One of the key featers of the Carrousel system lies in its ability to conserve energy use with resulting operating savings during time periods when the oxygenation needs of the installation are low, such as the early hours of the morning or when normal industrial, such as food processing, wastes are not being inputted into the system. The energy draw of the surface aerator is reduced during those periods but only to a point which does not result in inadequate mixed liquor propulsion. The lower radial flow impeller will allow greater power reductions and savings due to the improvement in the overall pumping efficiency of the two impeller system, particularly in the ability of the lower impeller to scour the channel bottoms and its higher efficiency.

Use of the dual impeller arrangement of this invention makes it possible to operate a Carrousel system as a so-called intermittent activated sludge process. Further, it is possible to increase the oxygenation capacity of the dual impeller arrangement by supplying compressed or aspirated air or oxygen to exit apertures in the lower impeller through the common shaft.

The intermittent activated sludge process relies on a separation of aeration and propulsion. The process is termed intermittent since it is operated first in an aeration mode followed by a quiescent settling period. After the settling period, the clear liquid formed at the top of the basin is decanted off as effluent. Generally, from 20–40% of the tank volume is removed during decanting.

Immediately after decanting, sewage is again allowed to enter the basin for refilling. Refilling takes several hours. During refilling, it is necessary to mix the sewage with the contents of the basin. This invention makes this possible via the lower mixing turbine. Aeration would also occur by means of air addition to the lower turbine and finally, as the mixed liquor level in the basin reaches the elevation of the surface, the surface aerator acts to aerate the mixed liquor at that elevation.

DETAILED DESCRIPTION OF THE DRAWINGS

Figure 1:
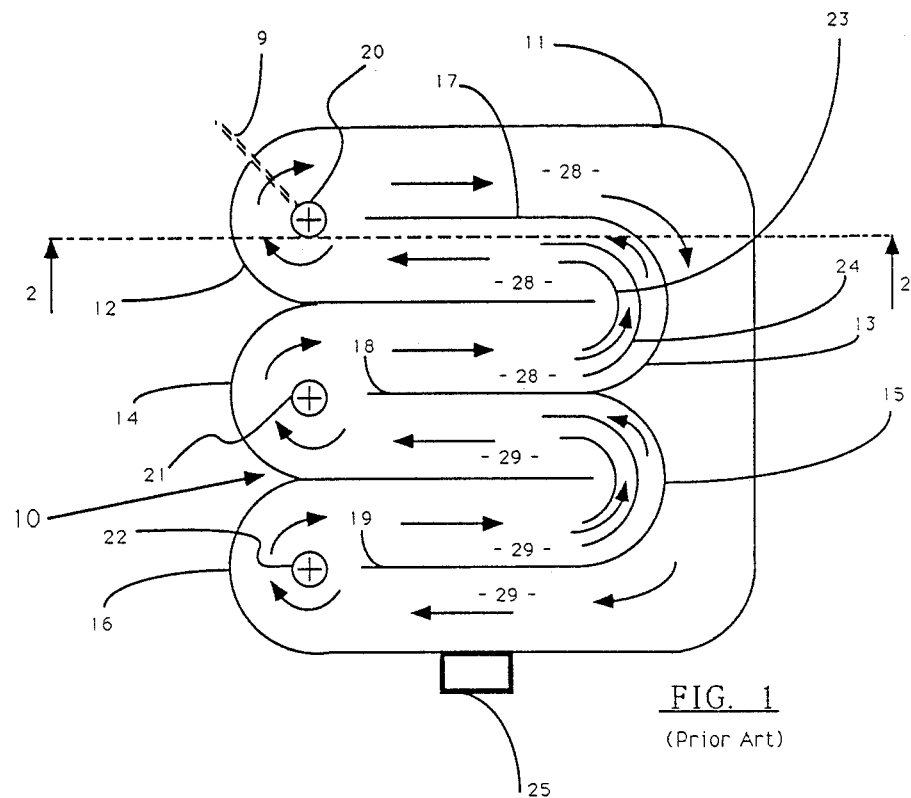
FIG. 1 is a schematic plan view of a typical orbital system employing the invention.

FIG. 1 shows a typical configuration of an orbital system 10, known as a Carrousel ® system, in which highly efficient aeration is provided by a series of low speed (about 25 to about 55 rpm) surface aerators 20, 21, 22 mounted at turning walls or communication sections 12, 14, 16 in a racetrack configuration formed by an outer tank wall 11, a series of partition walls 17, 18, 19 and additional turning walls 13, 15, normally all walls being constructed of concrete. The aerators act to provide mixed liquor mixing, aeration of the mixed liquor of waste water and activated sludge, and provide a plug flow of mixed liquor through the channels 28, 29 between the aerators and between either a partition and outer wall or between partitions. Residence times of 24 hours are common with the waste water making dozens of cycles around the overall circuit. Turning vanes 23, 24 are also typically employed in the channels to improve hydraulic efficiency. Influent enters the system by pipe 9 at one or more of the surface aerators. Level of the mixed liquor is controlled by a motor controlled weir 25 which also functions to remove mixed liquor from the top surface of the system. Each orbital basin is custom designed based on individual design parameters such as influent quantity and characteristics, desired effluent levels, site size and shape, and population and industries served and to-be-served in the future.

While the many hundreds of the Carrousel systems constructed and operated worldwide have been very successful, there have been some limitations, particularly that surface aeration mixing and propulsion has been limited to relatively shallow basins of from about 2 meters to about 4.5 meters deep. Tests over the past twenty years have shown that in order to obtain a satisfactory flow velocity of about 1 foot/second in the channels, that the majority of Carrousel installations can only be designed with basins having a maximum depth of about 3.5 meters. The industry has lived with this limitation for nearly two decades.

Figure 2:
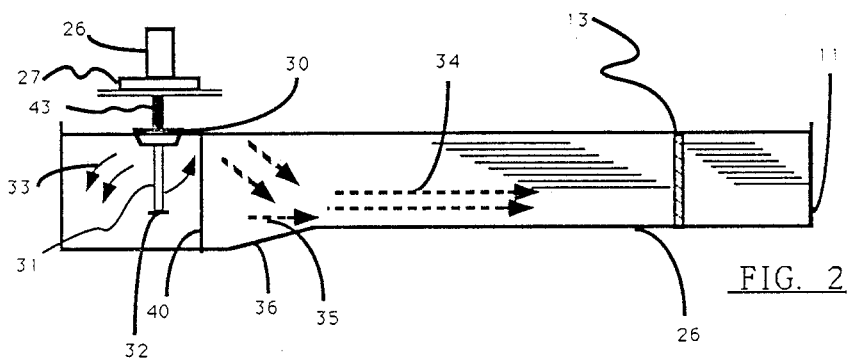
FIG. 2 is a schematic side view of an orbital system taken on the lines 1—1 of FIG. 1.

FIG. 2 illustrates the present invention where a mixed liquor pump 80 includes an auxiliary radial flow submerged impeller 32 provided at or adjacent to an end of a shaft extension 31 underneath the surface aerator 30 and extending from the surface aerator shaft 43. The impeller 32 provides for additional pumping and resulting propulsion of the mixed liquor in the channels by reason of the location of the radial flow impeller with respect to a bottom end edge 40 of the partition wall 17 forming the particular channel. The vertical axis of the surface aerator and the radial impeller are generally approximately aligned with the longitudinal axis of its associated partition, i.e. the axis of pump 80 and the longitudinal axis of wall 17, but may be slightly displaced. The lower radial flow impeller thus pumps mixed liquor in the same direction and directional manner as the surface aerator but a portion of the pumping energy is located adjacent to the tank or basin bottom 26. The basin may contain a deepened well area 36 which aids in the vertical mixing of mixed liquor by the surface aerator as shown by curved arrows 33. Dotted curved arrows show mixing behind the vertical partition 17 while straight dotted arrows 34 show the required velocity component resultant from the pumping action of both the surface aerator 30 and the lower radial flow impeller 32. The drive shaft 43 and the shaft extension 31 are rotatively driven together by motor 26 operating through a gear box 27 to provide the desired speed(s) of rotation. By reason of the additional lower impeller, the basin depth limitation is substantially increased by about at least 10% to 25% so that basin depths of from 2.5 to about 5.6 meters or greater can be utilized for the main channels 28, 29. Given a desired volume of the overall circuit, deeper channels require less concrete and less land space and thus are less costly.

A radial flow impeller has a higher pumping efficiency than do surface aerators. Improvement of efficiency will result in a reduction of the installed horsepower of surface aerators or a smaller number of surface aerators and lower impellers with resultant capital cost and operating savings.

Figures 3, 4, 5:
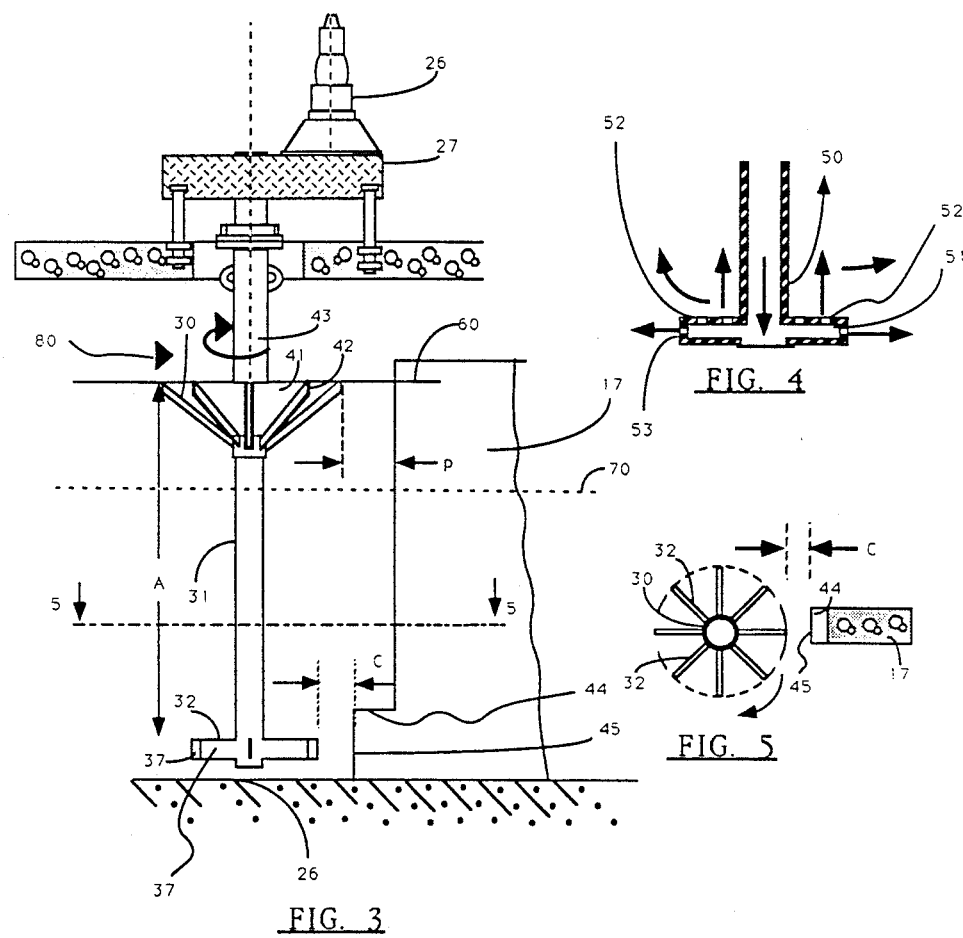
FIG. 3 is a side elevational view of the invention as mounted in an orbital system shown partially in section.
FIG. 4 is a cross-sectional partial view of a second embodiment of the radial flow impeller of the invention.
FIG. 5 is a plan view of the radial flow impeller taken on the line 5—5 of FIG. 3.
Figure 1:
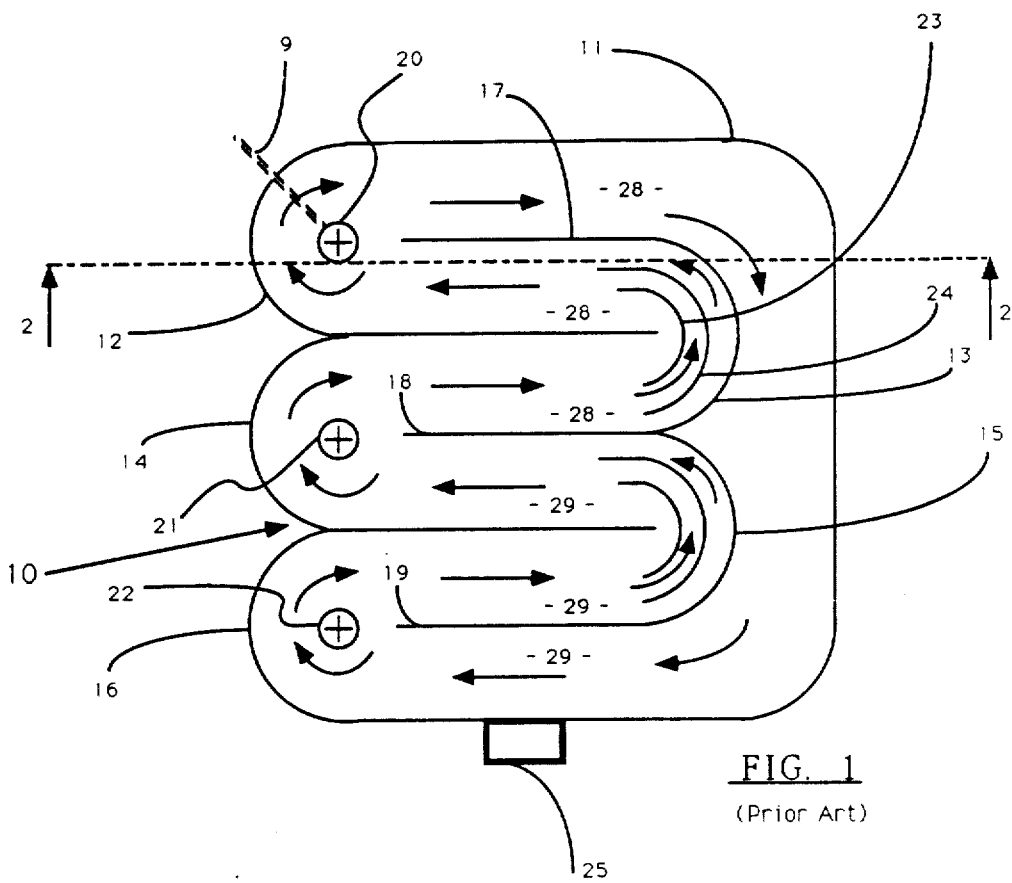
Figure 2:
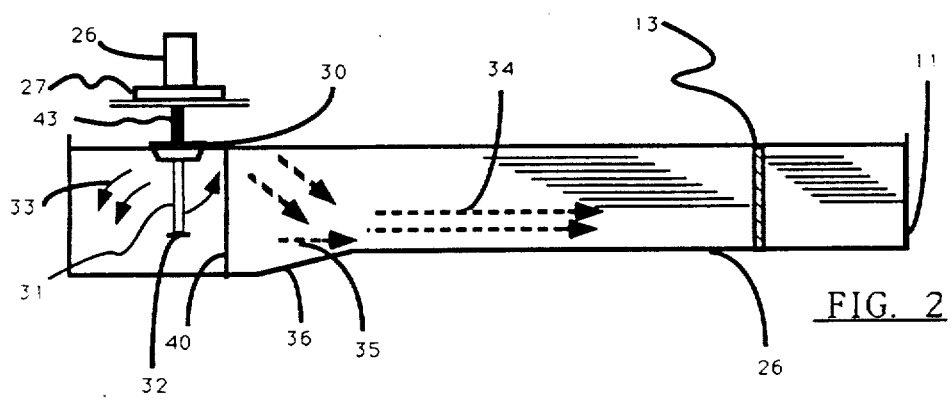

FIG. 3 illustrates the invention in more detail. The surface aerator 30 comprises an inverted conical plate 41 and a series of pumping vanes 42 attached to and radially depending from the underside of the conical plate. As motor 26 rotates shaft 43 through gear box 27, the affixed surface aerator 30 causes vertical mixing, introduction of air by oxygen transfer to the fine droplets formed by the pumping and turbulent action of the surface aerator on the waste water surface 60, and movement of the mixed liquor around the partition wall 17 into and through top channel 28 et al. (FIG. 1). Surface aerators typically have a diameter of from about 2.0 to about 4.0 meters. The clearance P of the surface impeller with the vertical end 40 of partition 17 is typically from about 5 to about 10 cm. Shaft extension 31 extends from shaft 43 and the surface aerator 30 over a distance A to an end on which a radial impeller 32 is affixed. Impeller 32 is formed by a series of typically four to twelve, 10–40 cm high, flat vertical radial impeller blades 37 affixed to shaft 31. The vertical distance A necessary for proper mixed liquor propulsion in a deep channel of from 4.0 to 5.0 meters should be at least 2.0 meters. The distance A should be at least 0.5 times, and preferably from about 0.75 to 1.0 times, the diameter of the surface aerator. The blades 37 are symmetrically arranged around the shaft end and result in a radial flow impeller 32 typically of from about 1 to aout 2 meters in diameter. A partition wall extension 44 is provided at the bottom of the partition wall 17 forming a vertical end wall 45 having a clearance C of about 5 to about 25 cm with the top ends of the impeller blades. This allows each blade to propel the mixed liquor in the same direction as does the upper surface aerator, as shown by the arrows at the left side of FIG. 1. The ratio of the diameter of the surface aerator to the diameter of the submerged radial lower impeller preferably should be from about 1.6 to about 3.0. The diameter of the lower radial flow impeller must be less than the diameter of the surface aerator otherwise, when appropriately sized blades of a height necessary for proper mixed liquor pumping are employed, the horsepower draw of the lower impeller and overall operating cost of the pump 80 will be excessive.

The bottom of the radial flow impeller is positioned typically at a preferred distance B from the bottom surface 26 of the communication sections 12, 14, 16 of the orbital circuit of from about ½ to about 2 meters. The distance is dictated by the diameter of the impeller 32 and the requirement that the bottom radial flow impeller causes flow along the bottom of the channels without excessive silting.

When an excess of oxygenation is present or the oxygen requirements are low, the energy draw of the overall surface aerator/radial impeller combination can be reduced with the more efficient lower radial impeller providing for adequate mixed liquid propulsion in the channels. Alternatively, the motorized weir 25 can be lowered to lower the wastewater level from level 60 to even as low as level 70 at which point the surface aerator 30 rotates in the air free of the mixed liquor and is inoperative for aeration and propulsion purposes.

In an additional embodiment of the invention seen in FIG. 4, shaft extension 50 and blades 51 are hollow to allow passage of compressed or aspirated air or oxygen to the mixed liquor adjacent to the bottom of the channels. Oxygen emission apertures 52 and 53 are provided on the blades top surfaces and at the blade distal ends, respectively.

The above description of embodiments of this invention is intended to be illustrative and not limiting. Other embodiments of this invention will be obvious to those skilled in the art in view of the above disclosure.

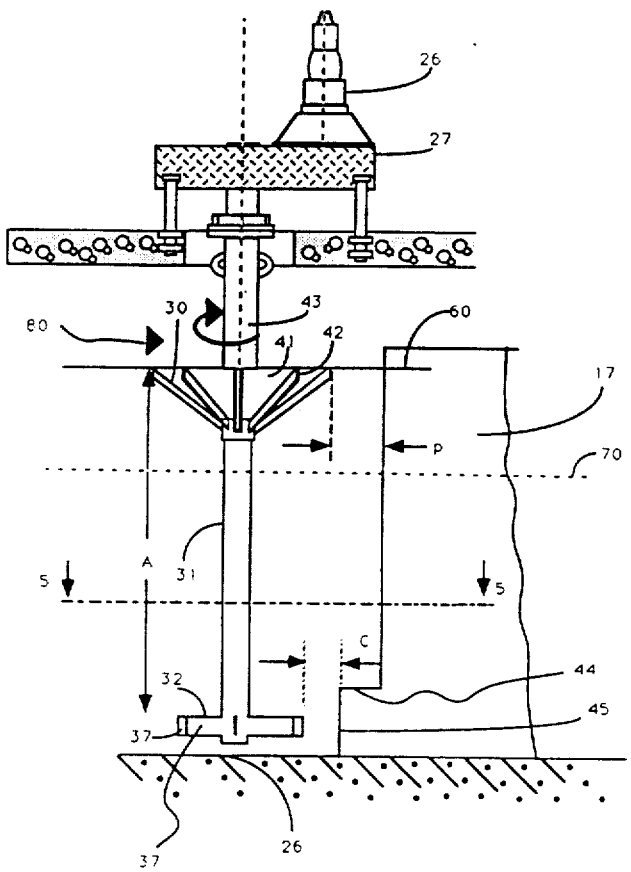

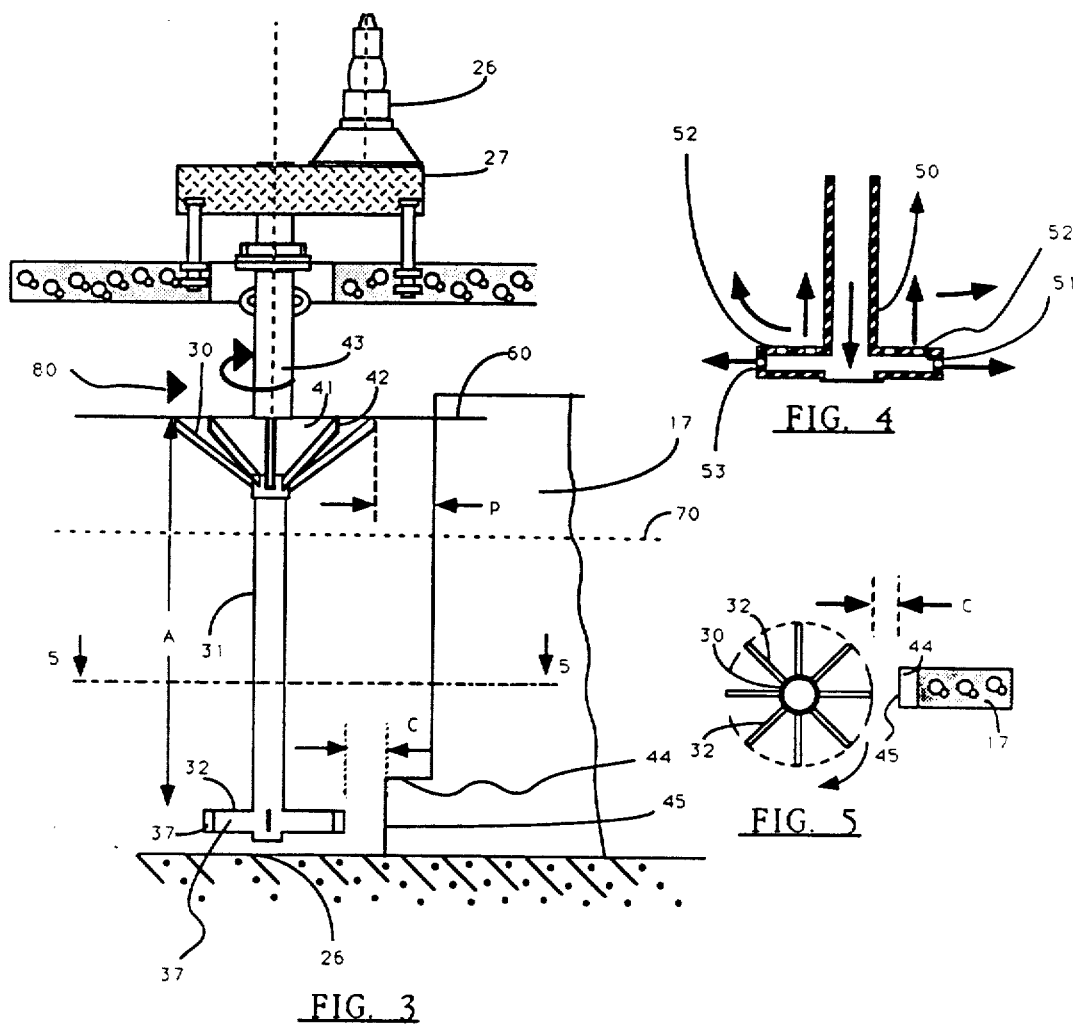

We claim:

1. A wastewater orbital treatment system comprising an elongated tank, for holding a moving volume of mixed liquor, at least one partition wall extending shoft of a tank curved turning wall to form at least a pair of parallel channels for mixed liquor movement and treatment, and at least one driven vertical mixed liquor pump positioned between an end of a partition wall and a turning wall and fixedly mounted for rotation in said tank, wherein said mixed liquor pump comprises:
    a driven vertical rotative shaft approximately axially aligned with the longitudinal axis of said partition wall,
    a radial flow submerged horizontal impeller attached adjacent to a lower end of said shaft and spacedly adjacent to and perpendicular to said partition wall end for orbitally moving mixed liquor through said channels in a fixed direction through one channel of said at least a pair of parallel channels,
    a surface aerator attached to said shaft spaced from and above said submerged horizontal impeller, said surface aerator being spacedly adjacent to and perpendicular to said partition wall end, and operable at a mixed liquor surface level in said tank for aerating and orbitally moving mixed liquor through said channels in the same direction as said fixed direction movement caused by said submerged horizontal impeller, said submerged impeller and said surface aerator are clearance spaced from said end of said partition wall and wherein said spaced clearance comprises having outer peripheries of said surface aerator and submerged impeller spaced from about 5 cm to about 25 cm from said end of said at least one partition wall.

2. The system of claim 1 in which said partition wall includes a lower wall extension and wherein said surface aerator has a greater diameter than the diameter of said submerged impeller and said submerged impeller is mounted juxtaposed in clearance with said lower wall extension.

3. The system of claim 1 in which a mixed liquor pump is provided between multiple turning walls and partition walls in said tank.

4. The system of claim 1 further including means for varying a mixed liquor level in said tank such that said mixed liquor level may be lowered below the level of said surface aerator and said mixed liquor is moved through said channels by action of said submerged impeller.

5. The system of claim 1 in which said radial flow submerged impeller comprises a series of radial blades extending from said shaft.

6. The system of claim 1 in which said submerged impeller includes apertured radial blades for injecting auxiliary oxygen to said mixed liquor.

7. A wastewater orbital treatment system comprising an elongated tank, for holding a moving volume of mixed liquor, at least one partition wall extending short of a tank curved turning wall to form at least a pair of parallel channels for mixed liquor movement and treatment, and at least one driven vertical mixed liquor pump positioned between an end of a partition wall and a turning wall and fixedly mounted for rotation in said tank, wherein said mixed liquor pump comprises:
    a driven vertical rotative shaft,
    a radial flow submerged horizontal impeller attached adjacent to a lower end of said shaft and spacedly adjacent to and perpendicular to said partition wall end for orbitally moving mixed liquor through said channels in a fixed direction through one channel of said at least a pair of parallel channels,
    a surface aerator attached to said shaft spaced from and above said submerged horizontal impeller, said surface aerator being spacedly adjacent to and perpendicular to said partition wall end, and operable at a mixed liquor surface level in said tank for aerating and orbitally moving mixed liquor through said channels in the same direction as said fixed direction movement caused by said submerged impeller; and in which said submerged impeller is from about 0.5 to about 2.0 meters above a bottom surface of said tank.

8. A wastewater orbital treatment system comprising an elongated tank, for holding a moving volume of mixed liquor, at least one partition wall extending short of a tank curved turning wall to form at least a pair of parallel channels for mixed liquor pump positioned between an end of a partition wall and a turning wall and fixedly mounted for rotation in said tank, wherein said mixed liquor pump comprises:

a driven vertical rotative shaft, a radial flow submerged horizontal impeller attached adjacent to a lower end of said shaft and spacedly adjacent to and perpendicular to said partition wall end for orbitally moving mixed liquor through said channels in a fixed direction through one channel of said at least a pair of parallel channels, a surface aerator attached to said shaft spaced from and above said submerged horizontal impeller, said surface aerator being spacedly adjacent to and operable at a mixed liquor surface level in said tank for aerating and orbitally moving mixed liquor through said channels in the same direction as said fixed direction movement caused by said submerged horizontal impeller, and in which said channels have depth of at least 2.5 meters and said submerged impeller is separated on said shaft from said surface aerator by a distance of at least 2.0 meters.

* * * * *

UNITED STATES PATENT AND TRADEMARK OFFICE
CERTIFICATE OF CORRECTION

PATENT NO. : 4,869,818　　　　　　　　　　　　　　Page 1 of 4

DATED : September 26, 1989

INVENTOR(S) : DiGregorio et al.

It is certified that error appears in the above-identified patent and that said Letters Patent is hereby corrected as shown below:

The title page should be deleted to appear as per attached title page.

The sheets of drawing consisting of figures 1-5 should be inserted as per attached sheets.

Signed and Sealed this

Twenty-sixth Day of March, 1991

Attest:

HARRY F. MANBECK, JR.

Attesting Officer　　　　　　Commissioner of Patents and Trademarks

United States Patent [19]
DiGregorio et al.

[11] Patent Number: 4,869,818
[45] Date of Patent: Sep. 26, 1989

[54] ORBITAL WASTEWATER TREATMENT SYSTEM WITH COMBINED SURFACE AERATOR AND SUBMERGED IMPELLER

[75] Inventors: David DiGregorio; Mark G. Biesinger, both of Salt Lake City; Frederick M. Riser, Sandy, all of Utah

[73] Assignee: Baker International Corporation, Houston, Tex.

[21] Appl. No.: 47,802

[22] Filed: May 8, 1987

[51] Int. Cl.⁴ .................. C02F 3/16; C02F 3/20
[52] U.S. Cl. .................. 210/194; 210/219; 210/220; 210/926
[58] Field of Search ........... 210/629, 194, 219, 926, 210/220; 261/87, 91, 93, 36 R

[56] References Cited

U.S. PATENT DOCUMENTS

| | | | |
|---|---|---|---|
| 3,510,110 | 5/1970 | Klein | 210/926 |
| 3,954,606 | 5/1976 | Block et al. | 261/91 |
| 4,267,052 | 5/1981 | Chang | 261/91 |
| 4,290,885 | 9/1981 | Kwak | 261/87 |
| 4,297,214 | 10/1981 | Guarnaschelli | 261/87 |

FOREIGN PATENT DOCUMENTS

| | | | |
|---|---|---|---|
| 2023981 | 11/1971 | Fed. Rep. of Germany | 261/87 |
| 2706078 | 8/1978 | Fed. Rep. of Germany | 210/926 |
| 718372 | 3/1980 | U.S.S.R. | 261/87 |

Primary Examiner—Benoit Castel
Attorney, Agent, or Firm—Skjerven, Morrill, MacPherson, Franklin & Friel

[57] ABSTRACT

An improved wastewater aeration and mixed liquor pumping arrangement for an orbital-type actuated sludge purification method includes the addition of a radial flow impeller on a shaft extension below the normal surface aerator. Both the combined radial flow impeller and surface aerator are positioned with respect to an end of a partition wall forming the flow channels of the orbital system such that both the impeller and the aerator pump the mixed liquor in the same direction, so that the mixed liquor is moved at a sufficient velocity through and around the various channels and returned. The radial flow impeller is positioned adjacent to the bottom of the orbital channel and enhances the propulsion of the mixed liquor along the bottom of the channel thus permitting deeper channels with attendant concrete and land area savings in constructing the system. The system may be operated at various wastewater levels so that when oxygenation levels are high or oxygenation needs are low, the level is lowered by a weir so that only the lower radial impeller functions to propel the mixed liquor. Auxiliary compressed or aspirated air may also be inputted through the lower radial impeller.

8 Claims, 2 Drawing Sheet